Sept. 18, 1923.
H. P. SCANLON ET AL
1,468,579
SWIVEL BLOCK
Filed Sept. 1, 1922
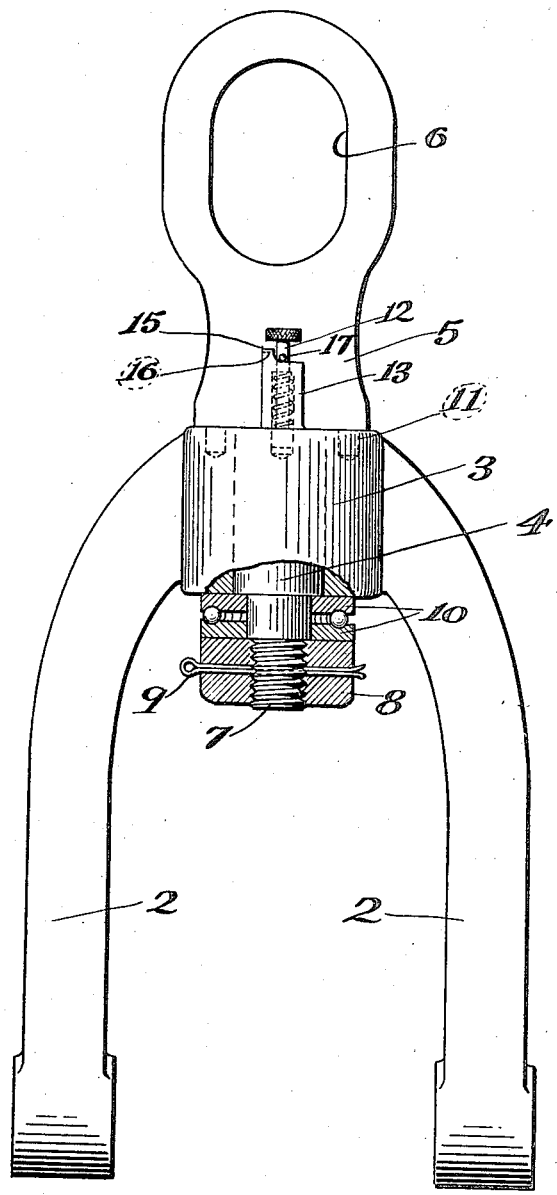
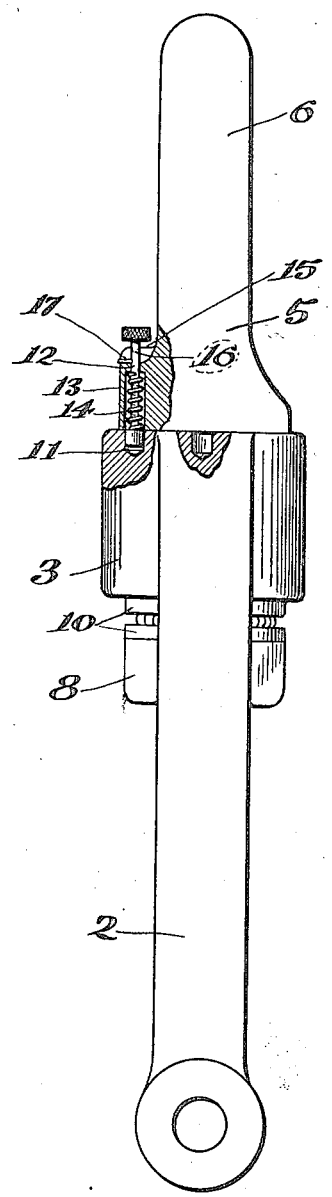
Inventors.
Henry P. Scanlon
James H. Schumacher
By Hazard and Miller
Attorneys.

Patented Sept. 18, 1923.

1,468,579

UNITED STATES PATENT OFFICE.

HENRY P. SCANLON AND JAMES H. SCHUMACHER, OF LONG BEACH, CALIFORNIA.

SWIVEL BLOCK.

Application filed September 1, 1922. Serial No. 585,653.

*To all whom it may concern:*

Be it known that we, HENRY P. SCANLON and JAMES H. SCHUMACHER, citizens of the United States, residing at Long Beach, in the county of Los Angeles and State of California, have invented new and useful Improvements in Swivel Blocks, of which the following is a specification.

This invention relates to swivels and particularly to the type of swivel disclosed in our application Serial No. 514,097, filed November 9, 1921 and allowed July 6, 1922.

In the form of swivel disclosed in the aforementioned application means extending down the side of the yoke of the swivel were pivoted on the eye body, and it is an object of the present invention to provide means arranged above the head of the yoke and carried by the shank of the eye for locking the yoke and the eye in relatively angular positions.

Another object is to provide an extremely simple, substantial and practical form of latching means arranged in such position as to be clear of the sides of the yoke.

Another object is to provide for the retaining of the retracted latch in a disengaging position to permit the yoke to swivel as to the eye.

Other objects and advantages will be made manifest in the following specification of an embodiment of the invention illustrated in the accompanying drawings, wherein:

Figure 1 is an edge view of the swivel with parts in section to show the latching means.

Figure 2 is a front elevation of the swivel with portions in section.

The swivel consists of a yoke having side arms 2 jointed at a head 3 which is perforated axially of the yoke to receive the cylindrical end 4 of an eye shank 5 having an eye or loop 6 at its upper part. The cylindrical portion 4 of the eye forms a rotatable pin passing through the head of the yoke and the lower end of this pin is threaded at 7 to receive a nut 8 through which and the screw there may be passed a cotter pin or other holding element 9. There may be interposed between the nut 8 and the bottom end of the head or bearing 3 an anti-friction device 10.

The above construction permits the ready rotation of the eye and the yoke relatively and it is an object to provide an extremely simple, practicable, substantial and easily actuated means for locking the swivel parts in given positions.

To accomplish this the upper end face of the yoke head 3 is provided with a plurality of pockets or pin holes 11 and mounted on the hub of the shank 5 is a locking pin or key 12 arranged for sliding movement substantially parallel to the axis of the swivel, although it may be otherwise disposed.

The pin 12 is arranged in a socket 13 and is surrounded by a spring 14 therein, which serves to press the pin into one of the pockets 11. The upper end of the socket 13 is provided with an upwardly extending shoulder 15 and this is provided with a slight recess 16. The pin or latch member 12 is provided with a radially extending lug 17 and this is adapted to be pulled upwardly and turned so as to register in the groove 16 in the head of the shoulder 15. When in this position the eye is free from the yoke and can be rotated at will. To latch the eye and the yoke in relatively changed positions, it is only necessary to turn the eye to bring the pin or latch 12 into register with one of the pockets 11 and then the latch pin 12 is released and its end, entering the registered pocket, locks the swivel members together.

Further embodiments, modifications and variations may be resorted to within the spirit of the invention as here claimed.

What is claimed is:

1. A swivel comprising an eye portion, a yoke rotatably connected to the eye portion, the yoke having a head provided with a plurality of sockets, and a latch pin slidingly mounted on the eye member within the periphery of the head and yieldingly pressed toward the pockets in the head member whereby to lock the parts in fixed position.

2. A swivel comprising an eye portion, a yoke rotatably connected to the eye portion, the yoke having a head provided with a plurality of sockets, a latch pin slidingly mounted on the eye member in parallelism with the axis of the swivel and yieldingly pressed toward the pockets in the head member whereby to lock the parts in fixed position, and means for holding the latch pin in disengaged position to free the eye and the yoke.

3. A swivel comprising an eye portion, a yoke rotatably connected to the eye portion, the yoke having a head provided with a plurality of sockets on one end face, a latch pin slidingly mounted on the eye member and yieldingly pressed toward the pockets in the head member whereby to lock the parts in fixed position, said eye having a chamber at one side in which the latch pin is arranged, and a spring in said chamber surrounding the pin and actuating the same in one direction.

4. A swivel comprising an eye portion, a yoke rotatably connected to the eye portion, the yoke having a head provided with a plurality of sockets on one end face, a latch pin slidingly mounted on the eye member in parallelism with the axis of the swivel and yieldingly pressed toward the pockets in the head member whereby to lock the parts in fixed position, and a guide on one side of the eye for the latch pin and having a shoulder, said pin having a lug adapted to engage the shoulder and hold the pin in retracted position.

In testimony whereof we have signed our names to this specification.

HENRY P. SCANLON.
JAMES H. SCHUMACHER.